United States Patent
Denner et al.

(10) Patent No.: US 10,083,322 B2
(45) Date of Patent: Sep. 25, 2018

(54) OBSCURING USER WEB USAGE PATTERNS

(71) Applicant: INTERNATIONAL BUSINESS MACHINES CORPORATION, Armonk, NY (US)

(72) Inventors: Gary Denner, Longwood (IE); Daniel C. Gurney, Worcester, MA (US); Liam Harpur, Skerries (IE); Brian A. O'Crowley, Blackrock (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 309 days.

(21) Appl. No.: 14/814,084

(22) Filed: Jul. 30, 2015

(65) Prior Publication Data
US 2017/0032147 A1 Feb. 2, 2017

(51) Int. Cl.
H04L 21/00 (2006.01)
G06F 21/62 (2013.01)
H04L 29/08 (2006.01)
H04L 29/06 (2006.01)

(52) U.S. Cl.
CPC ...... G06F 21/6263 (2013.01); H04L 63/0281 (2013.01); H04L 63/04 (2013.01); H04L 63/1425 (2013.01); H04L 67/22 (2013.01)

(58) Field of Classification Search
CPC ............ G06F 21/6245; G06F 21/6263; G06F 21/6254; H04L 63/0281; H04L 63/04; H04L 63/1425; H04L 67/02; H04L 67/22; H04L 67/28; H04L 67/306

USPC .......................................................... 726/23
See application file for complete search history.

(56) References Cited

U.S. PATENT DOCUMENTS

| 7,546,539 B2 | 6/2009 | Kivilov et al. |
| 8,776,168 B1* | 7/2014 | Gibson ................ H04L 63/104 709/225 |
| 2010/0325245 A1 | 12/2010 | Sibillo |
| 2011/0320450 A1 | 12/2011 | Liu et al. |
| 2012/0158953 A1* | 6/2012 | Barnes .................... G06F 21/60 709/224 |

(Continued)

OTHER PUBLICATIONS

"Bad News, You Can Be Uniquely Identified by Your Browsing History", BreadCrumbs, Online Privacy Solutations, accessed via the Internet from <http://breadcrumbssolutions.com/2012/07/bad-news-you-can-be-uniquely-identified-by-your-browsing-history/> as of Jul. 29, 2015, 2 pages.

(Continued)

*Primary Examiner* — Yogesh Paliwal
(74) *Attorney, Agent, or Firm* — Gates & Cooper LLP

(57) ABSTRACT

An injection engine monitors whether a pattern of a current selection of web address requests in outbound web traffic for a user matches one or more web usage patterns that allow for identifying the user based on the current selection of web address requests. The injection engine, responsive to detecting the pattern of the current selection of web address requests by the user matches the one or more web usage patterns, injects one or more random valid web address requests into the outbound web traffic for the user, wherein the one or more random valid web address requests obscure the current selection of web address requests from using the one or more web usage patterns.

20 Claims, 7 Drawing Sheets

(56) References Cited

U.S. PATENT DOCUMENTS

2013/0254364 A1\* 9/2013 Moganti ................. H04L 63/20
709/223
2014/0259147 A1 9/2014 L'Heureux et al.

OTHER PUBLICATIONS

Olejnik et al, "Why Johnny Can't Browse in Peace: On the Uniqueness of Web Browsing History Patterns", accessed via the Internet from <https://www.petsymposium.org/2012/papers/hotpets12-4-johnny.pdf> as of Jul. 29, 2015, 16 pages.
"Tempora", Wikipedia, accessed via the Internet from <https://en.wikipedia.org/wiki/Tempora> as of Jul. 29, 2015, 4 pages.
"HTTPS Everywhere FAQ", Electronic Frontier Foundation, accessed via the Internet from >https://www.eff.org/https-everywhere/faq> as of Jul. 29, 2015, 6 pages.

\* cited by examiner

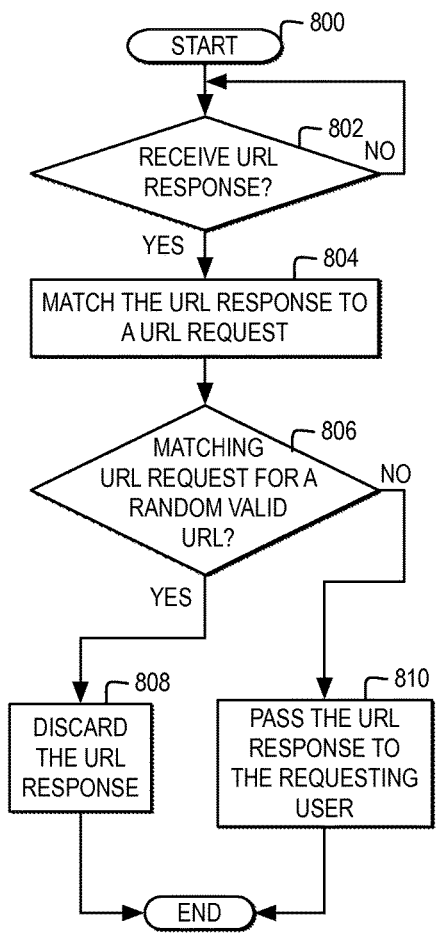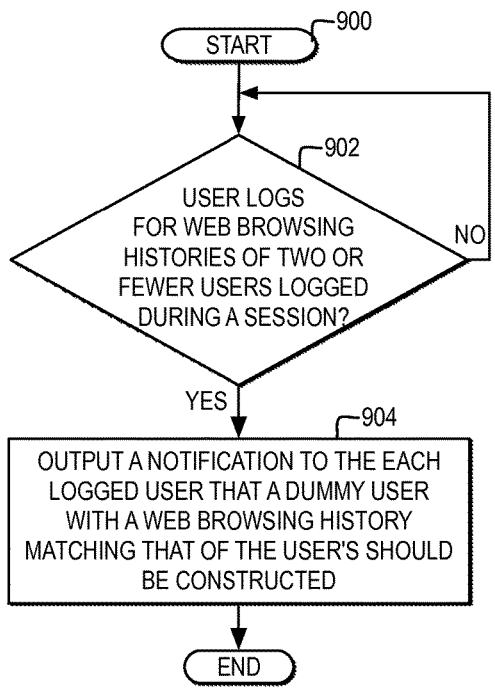
FIG. 8
FIG. 9

OBSCURING USER WEB USAGE PATTERNS

BACKGROUND

1. Technical Field

The embodiment of the invention relates generally to identity security and particularly to obscuring user web usage patterns to disrupt user identification by one or more other parties when a user is browsing the web.

2. Description of the Related Art

When a user is browsing via a web browser, other parties may attempt to track the user's web browsing history in order to identify the user from the user's web usage patterns.

BRIEF SUMMARY

Other parties, such as websites and content providers, may uniquely identify a user solely from the user's web usage pattern. When a user is browsing, the user may not want to be tracked by one or more other parties. Therefore, in view of the foregoing, there is a need for a method, system, and computer program product for obscuring user web usage patterns to disrupt user identification by other parties when a user is browsing the web.

In one embodiment, a method comprises a computer system for monitoring whether a pattern of a current selection of web address requests in outbound web traffic for a user matches one or more web usage patterns that allow for identifying the user based on the current selection of web address requests. The method comprises the computer system, responsive to detecting the pattern of the current selection of web address requests by the user matches the one or more web usage patterns, for injecting one or more random valid web address requests into the outbound web traffic for the user, wherein the one or more random valid web address requests obscure the current selection of web address requests from using the one or more web usage patterns.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to monitor whether a pattern of a current selection of web address requests in outbound web traffic for a user matches one or more web usage patterns that allow for identifying the user based on the current selection of web address requests. The stored program instructions comprise program instructions, responsive to detecting the pattern of the current selection of web address requests by the user matches the one or more web usage patterns, to inject one or more random valid web address requests into the outbound web traffic for the user, wherein the one or more random valid web address requests obscure the current selection of web address requests from using the one or more web usage patterns.

In another embodiment, a computer program product comprises one or more computer-readable storage devices and program instructions, stored on at least one of the one or more storage devices. The stored program instructions comprise program instructions to monitor whether a pattern of a current selection of web address requests in outbound web traffic for a user matches one or more web usage patterns that allow for identifying the user based on the current selection of web address requests. The stored program instructions comprise program instructions, responsive to detecting the pattern of the current selection of web address requests by the user matches the one or more web usage patterns, to inject one or more random valid web address requests into the outbound web traffic for the user, wherein the one or more random valid web address requests obscure the current selection of web address requests from using the one or more web usage patterns.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 8 illustrates a high level logic flowchart of a process and computer program for managing URL responses, including URL responses to URL requests for random valid URLs; and FIG. 9 illustrates a high level logic flowchart of a process and computer program for monitoring the number of user's web browsing histories being logged to determine whether to recommend creation of a dummy user with a web browsing history matching that of the current users.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
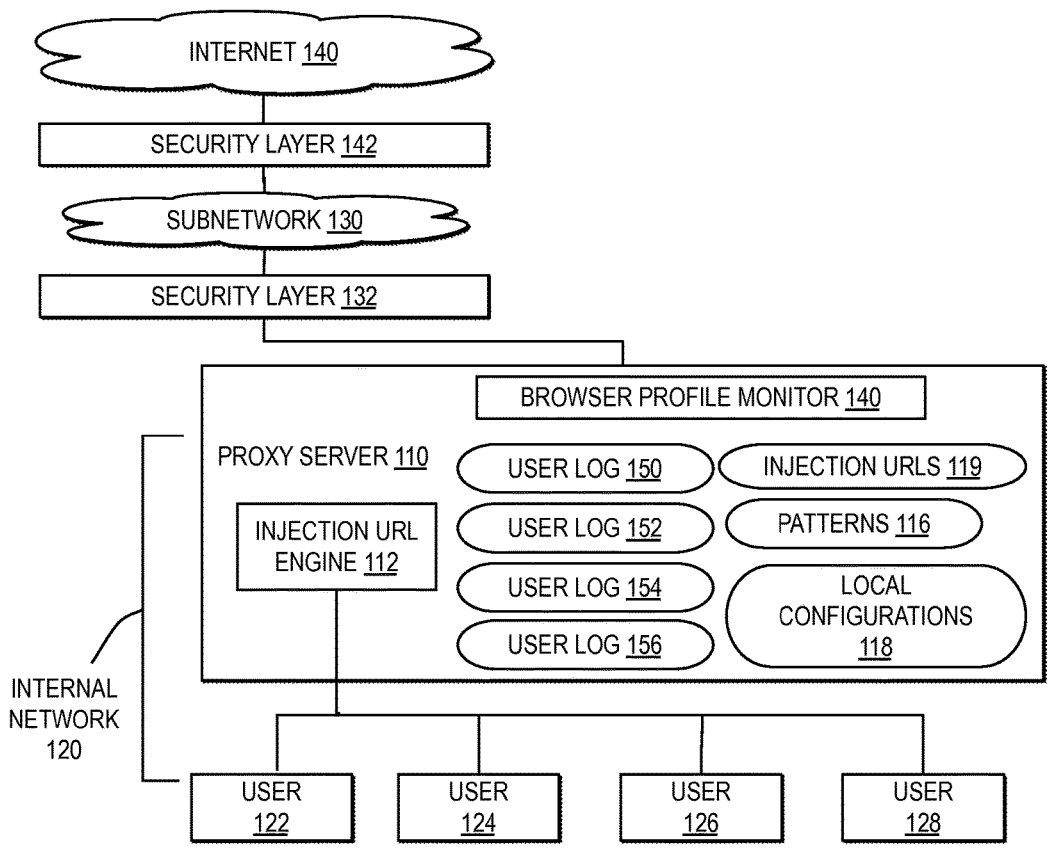
FIG. 1 illustrates one example of block diagram of an injection URL engine integrated into a proxy server for serving as a proxy for outbound URL requests and for selectively injecting random valid URL requests into a web usage pattern for a user to obscure the user's web usage pattern.

FIG. 1 illustrates a block diagram of one example of an injection URL engine integrated into a proxy server for serving as a proxy for outbound URL requests and for selectively injecting random valid URL requests into a web usage pattern for a user to obscure the user's web usage pattern.

In one example, one or more users sending outbound URL requests through an internal network 120 direct outbound URL requests to an injection URL engine 112. For example, a user 122, a user 124, a user 126, and a user 128 may each send outbound URL requests to injection URL engine 112. In one example, one or more URL requests may be generated by a web browser as a user is browsing through one or more interfaces of the web browser. In another example, one or more URL requests may be generated by other functional software and hardware components associated with a particular user.

In one example, injection URL engine 112 is executing on a proxy server 110 that handles all web traffic user 122, user 124, user 126, and user 128 within an internal network 120. Proxy server 110 sends each outbound URL request from a user to a requested network location that may be outside of internal network 120. For example, proxy server 110 may send each outbound URL request through one or more network security layers to one or more network layers. In one example, proxy server 110 may send outbound URL requests through a security layer 132, such as a firewall, to a subnetwork 130. In one example, subnetwork 130 may represent one or more types of subnetworks including, but not limited to, a demilitarized zone (DMZ) and a perimeter network. In one example, each outbound URL request may route through subnetwork 130, through another security layer 142, to internet 140, to access a network location. In another example, proxy server 110 may send outbound URL requests through security layer 132 directly to internet 140 or other network layers. In addition, proxy server 110 receives inbound URL responses, determines the URL request to which the response is received, and passes the URL response to the requesting user. One of ordinary skill in the art will appreciate that proxy server 110 may send outbound URL requests and receive inbound URL requests through additional or alternate network layers in additional or alternate examples.

In one example, injection URL engine 112 may maintain a separate user log for each user, such as a user log 150 maintained for user 122, a user log 152 maintained for user 124, a user log 154 maintained for user 126, and a user log 156 maintained for user 128. In one example, for each URL request received from a user, injection URL engine 112 updates the user log corresponding to the user with the URL from the URL request. In another example, injection URL engine 112 may maintain a single user log for multiple users, and mark each entry with an identifier of the user sending the URL request.

In another example, injection URL engine 112 may first select a subset of users, from among user 122, user 124, user 126, and user 128, where injection URL engine 112 only updates user logs for outbound URL requests from the subset of users, while allowing for transparent transport for the other user web traffic to security layer 132. For example, injection URL engine 112 may select to update user log 150 to log URL requests for user 122, but not log URL requests from user 124, user 126, and user 128 in user log 152, user log 154, and user log 156. Injection URL engine 112 may apply one or more criteria to determine the subset of users. In one example, injection URL engine 112 may select the subset of users by first requesting consent from each of the users accessing internal network 120 and adding the users that authorize consent into the subset of users for which URL requests are logged. In another example, injection URL engine 112 may select a subset of users according to criteria specified by an entity hosting internal network 120 or proxy server 110.

In one example, injection URL engine 112 monitors the entries in each of user log 150, user log 152, user log 154, and user log 156 to determine whether each user's web browsing history is starting to match a web usage pattern from which it is likely that one or more other parties could ascertain the unique identity of the user. In one example, injection URL engine 112 may analyze the entries in each of user log 150, user log 152, user log 154, and user log 156 with one or more web usage patterns specified in patterns 116 to determine whether a user's web browsing history is starting to match a web usage pattern from which it is likely that one or more other parties could ascertain the unique identity of the user. In one example, patterns 116 may include specific URLs, specific times, specific ordering, weighting, and other specifications that are indicative of web usage patterns from which one or more other parties are likely to ascertain the unique identity of a user. In another example, injection URL engine 112 may compare entries in a user log for one user, such as entries in user log 150 for user 122, with entries in one or more other user logs for one or more other users, such as entries in user log 152 for user 124, to track differences between the user entries and deduct which patterns within each user log may make a user uniquely identifiable.

In one example, one or more other parties may represent one or more of a web site, a content provider, a server, and an application. In one example, each user may specify, or proxy server 110 may specify, one or more types of other parties that a user or entity have not authorized to ascertain the unique identity of a user. The one or more other parties may include one or more parties that provide a website the user has accessed. The one or more other parties may include parties that the user or proxy server 110 has authorized to access a specific aspect of a user's identity, but that the user or proxy server 110 has not authorized to track web browsing history of the user to track other aspects of the user's identity. The one or more other parties may include a third party that is able to track the user's web browsing history, but that does not provide any web browsing service requested or authorized by the user.

In one example, a user's web browsing history, which may reflect a web usage pattern, may provide one or more other parties with the information required to ascertain the unique identity of the user, even if the user is searching from a different network location or from a different device from one web browsing session to a next web browsing session. For example, if a user's web usage pattern is detected by one or more other parties at one time, and the user's identity ascertained from a user log in or other information provided by the user, if a web usage pattern reflected in a user's web browsing history is detected again at another time period, the user may be identified based on detecting the matching patterns at different times. A user's web usage pattern may include, but is not limited to, the selection of URLs by a user, the amount of time spent accessing each URL, the order in which the URLs are accessed, the selections made through a particular URL, and other trackable interactions by a user with URLs. In particular, in one example, a web usage pattern may include, but is not limited to, a first specific URL after an average of 180 seconds, a second specific URL after an average of 80 second, a third specific URL after an average of 120 seconds, and a fourth specific URL after an average of 20 seconds.

In one example, when injection URL engine 112 determines that a user's web browsing history is starting to match a web usage pattern from which it is likely that one or more other parties could ascertain the unique identity of the user, injection URL engine 112 may automatically inject random valid URLs into the outbound URL requests to obscure the web usage pattern and effectively hide the identity of the user. In one example, injection URL engine 112 may access one or more random valid URLs from injection URLs 119 and inject the selected random valid URLs, specified for a particular user, into the outbound URL requests. By injecting one or more random valid URLs from injection URLs 119 into the output URL requests for a user, the user's web usage pattern is obscured, or disguised, by the injected URLs to disrupt the ability of one or more other parties to ascertain the unique identity of the user based on the user's web browsing history. In one example, each of the random valid URLs may be an actual URL for an existing address, such that outbound URL requests for the random valid URLs are sent to verifiable URL addresses and responded to by servers with URL responses sent to proxy server 110.

In selecting one or more random valid URLs from injection URLs 119, the type and contents of web pages accessed by the user in the web usage pattern may be analyzed in determining the pattern of random valid URLs from injection URLs 119 to insert. For example, if a web usage pattern for a contains static HTML responses, then one or more random valid URLs that return static HTML responses may be selected from among injection URLs 119.

In one example, when injection URL engine 112 determines that injection URLs 119 need to be injected in a user's outbound URL requests, injection URL engine 112 may first determine whether the user is specified as a priority user to determine the selection of random valid URLs to inject from injection URLs 119. For a user that is marked as a priority user, the amount and type of selection of random valid URLs to inject may be adjusted to further obscure the user's web usage patterns and increase the security provided to the user's identity. In one example, because injecting random valid URLs into the outbound web traffic from proxy server 110 requires additional bandwidth, which may add additional cost to the use of proxy server 110 or may slow down the network access point from proxy server 110, a cost may be assessed for identifying a user as a priority user and increasing the number of random valid URLs injected. In one example, local configurations 118 may specify whether a user is a priority user. In another example, the web requests received from a user may indicate whether the user is a priority user. In one example, if injection URL engine 112 determines that a user is a priority user, injection URL engine 112 may determine whether local configurations 118 specify a particular selection of random valid URLs from injection URLs 119 or specify an amount, frequency, or type of random valid URL from injection URLs 119 that is different from a default selection. If local configurations 118 specify a particular selection of random valid URLs from injection URLs 119 or specify an amount, frequency, or type of random valid URLs, then injection URL engine 112 applies the particular selection of random valid URLs from injection URLs 119.

In one example, if local configurations 118 does not specify a particular selection, then injection URL engine 112 may send a request message to the priority user requesting that the user specify local configurations 118 by designating a selection of random valid URLs from injection URLs 119. For example, injection URL engine 112 may send a request message to the priority user requesting that the user specify which user log, from among the other users, to use for injecting random valid URLs into the web traffic for the user. In another example, in response to the request message from injection URL engine 112, a user may designate a particular user log of another user or the user may select one or more rules for injection URL engine 112 to apply to select a user log of another user. For example, user 122 may select a rule for injection URL engine 112 to select user log 152 of user 124 to apply as random valid URLs from injection URLs 119 if user 124 is in a particular geographic location and is currently online. In additional or alternate examples, a user may set rules for injection URL engine 112 to apply to select from among one or more user logs to apply as random valid URLs from injection URLs 119 based on additional or alternate criteria.

In one example, local configurations 118 for a user may also include a selection for a user to be prompted prior to injection URL engine 112 injecting random valid URLs into the outbound web traffic for the user, and the user to be provided with a selectable option whether to allow injection URL engine 112 to inject the random valid URLs into the outbound web traffic for the user. In one example, injection URL engine 112 may log each selection by a user in local configurations 118 and over time, injection URL engine 112 may detect a selection pattern generally applied by the user in local configurations 118 and dynamically determine, based on the selection pattern, whether to elect to not prompt the user with lower risk patterns that the user generally does not request random valid URL injections for and to prompt the user with higher risk patterns that the user generally does request random valid URL injections for. In another example, a user may specify, within local configurations 118 specific selections from among patterns 116 that the user considers low risk, and does not request random valid URL injections for, or specific selections from among patterns 116 that the user considers high risk, and requests random valid URL injections automatically into.

In one example, injection URLs 119 may include URLs from one or more sources including, but not limited to, one or more URLs that are preselected by an administrator for proxy server 110, one or more URLs that are captured from the web browsing history of one or more users by proxy server 110, and one or more URLs that are randomly selected by proxy server 110 by searching for URLs using one or more search terms. In additional or alternate examples, injection URL engine 112 may include a dynamic URL selector that includes rules for selecting URLs to optimize the disruption of detectable web usage patterns.

In one example, in general, one or more parties other than a user, such as websites and content providers, may attempt to uniquely identify a user solely from the user's web usage pattern. In one example, a user's browsing history may uniquely identify a user in the same way that a fingerprint uniquely identifies a user. In one example, to uniquely identify a user based on the user's browsing history, one or more other parties that attempt to uniquely identify a user from the user's web usage pattern may compile a list of the most popular websites, sorted by popularity, where each website is treated as a binary vector. Next, the one or more other parties may build a profile for each user's browser history by comparing each website viewed by the user to the list of most popular websites. The vector assigned to the most popular website matching the website viewed by the user may be marked on the vector as a "1", and all other websites marked as a "0", yielding a profile vector that includes 1's and 0's to reflect a selection of the most popular websites visited by the user. The one or more other parties may identify a unique user profile for each user based on the browsing history of the user as tracked in profile vector markings. In one example, to track users, the one or more other parties need be able to create the same profile for a user each time the one or more other parties access the user's browsing activity. In one example, while a user may select to manually or automatically delete the user's browser cache and history, and deleting the browser cache and history may reduce the likelihood that the one or more other parties may create the same profile for a user, users still generally browser the same topics and websites over time, yielding a browsing history from which a user's identity may be tracked, and deleting the user's browser cache and history does not modify the user's actual web usage pattern. In addition, the one or more other parties may include a tracker website that may use other methods to detect a user's browsing history, such as, but not limited to, a cascading style sheet (CSS) visited mechanism and Domain Name System (DNS) query timing. Additionally, a user may opt to block scripts, to reduce the options for a tracker website to track the user's browser history, however blocking scripts may impact and minimize the usability of the browser. Further, a user may attempt to prevent one or more other parties from tracking the user's unique identity by using one or more selectable techniques including, but not limited to, hiding the user's IP address, not authenticating on websites to stay anonymous, creating shell or fictitious accounts for websites, using multiple devices, and using multiple Internet Service Providers (ISPs), however these selectable techniques do not modify the user's actual web usage pattern. In contrast, injection URL engine 112 modifies the user's actual web usage pattern by injecting additional random valid URLs into the outbound URL web traffic for each user, at the proxy server level, to disrupt one or more other parties from uniquely identifying the user from the user's web usage when the user is browsing the web. By modifying the user's actual web usage pattern that is detectable by one or more other parties through injection URL engine 112, injection URL engine 112 provides for increased protection of a web user's anonymity, improves defenses against phishing attempts for user identities, reduces a Personally Identifying Information (PII) footprint for a user, removes personally identifiable tags in a browser that facilitate identity profiling, removes the overhead of a user attempting to use selectable options to try to mitigate against web pattern history based identification, improves proxy server filtering for securing user identities, and allows web users to focus on web browsing without needing to perform manual actions to mitigate against web pattern history based identification.

In one example, patterns 116 may also include a selection of one or more web browsing rules setting user browsing activity that triggers injection URL engine 112 to automatically, preemptively select and insert particular random valid URLs into the outbound web traffic. For example, patterns 116 may include rules that help manage website browsing by specifying that particular types of website requests that trigger injection URL engine 112 to automatically insert a selection of random valid URLs as a matter of course. In one example, patterns 116 may specify particular websites or types of websites that trigger injection URL engine 112 preemptively insert random valid URLs, such as if a user selects a website for a social media service or a medical service, such that specific websites within the user's browsing history trigger obscuring of the user's web usage patterns through injection of random valid URLs. In addition, in specifying patterns 116 for a specific website or type of website, a user may further specify rules for pattern hierarchies that trigger injection URL engine to automatically insert a selection of random valid URLs. For example, a pattern hierarchy may specify that an IP address, device or browser that holds patterns 116 for different users may have different applications depending on the current user, such as if user 122 accesses "website A", injection URL engine 112 is triggered to insert random valid URLs, but if user 124 accesses "website A", injection URL engine 112 is not triggered to insert random valid URLs.

In addition, in one example, patterns 116 may also include rules specified based on the URL itself and associated content of the URL, since the content of a URL may be variable, and the variability provides unique identifiers for one or more other parties to use to build a user identity signature based on web usage patterns. Injection URL engine 112 may interrogate the URL and associated content to determine what variables are included and may determine, based on rules set for different variables in patterns 116, a recommendation for action, such as whether to inject random valid URLs.

In addition, in one example, injection URL engine 112 may include a function for anticipating the next URL action of a user. Patterns 116 may include one or more rules for preemptively directing a user to request that the anticipated next URL action of the user be implemented from another device, in addition to, or as an alternative to, triggering injection URL engine 112 to insert random valid URLs into the outgoing web traffic.

In one example, when injection URL engine 112 injects random valid URLs into the outbound web traffic for a user, the random valid URL requests are actually transmitted to server locations from proxy server 110, and responses to the random valid URL requests are received and handled by proxy server 110. In injecting random valid URLs into the outbound web traffic for a particular user, in one example, injection URL engine 112 may insert data in one or more Hypertext Transfer Protocol (HTTP) fields of random valid URL requests before inserting the random valid URL request into the web traffic flow for the user, where the inserted data may allow proxy server 110 to identify and distinguish injected random valid URL requests from user initiated URL requests and handle responses to the injected random valid URL requests in a different manner from responses to user initiated URL requests. In addition, when URL engine 112 injects random valid URLs into the outbound web traffic for a user, the user's web browser history and cache may be updated to reflect the injected random valid URLs in a manner such that if one or more other parties access the web browser history and cache the injected random valid URLs appear as if the user requested the URLs as part of the user's web browsing history.

In one example, if injection URL engine 112 does not detect that a user's current web browsing history matches one of patterns 116 in time for injection URL engine 112 to inject random valid URL requests into the user's web browsing traffic to obscure the detected pattern, injection URL engine 112 may send a notification to the user to select to generate a dummy user with a matching dummy web pattern to the user's current web pattern. In one example, injection URL engine 112 may include a component for automating the creation of a dummy user and matching dummy web pattern, so as to associate the dummy web pattern with the dummy user identity, rather than the user's actual identity and obscure future attempts to identify the user based on the web pattern.

In one example, proxy server 110 may include additional or alternate components for managing outbound URL requests and inbound URL responses from multiple users and for directing inbound URL responses to the intended user. In one example, for inbound URL responses, injection URL engine 112 may determine whether the inbound URL response is in response to a random valid URL request injected by injection URL engine 112 into the outbound web traffic to obscure a user's web usage pattern. Proxy server 110 may drop inbound URL responses that are in response to the random valid URL request injected into the outbound web traffic.

In one example, proxy server 110 may also include, within injection URL engine 112, or as a separate component, one or more monitors, such as browser profile monitor 140, that detect attempts by one or more other parties to profile a web browser of user 122, user 124, user 126, or user 128. In one example, when browser profile monitor 140 detects an attempt by one or more other parties to profile a user's web browser or detects that a user's web browsing pattern may allow for the user to be identified, browser profile monitor 140 may perform as an interface of a default browser for reporting neutral settings, without user identifying information. For example, each supported browser may have its own neutral, generic profile, from among browser including, but not limited to, Safari, Internet Explorer, Firefox and Chrome. When a browser issues a "user agent" header to a website, browser profile monitor 140 may automatically replace the "user agent" header with the neutral profile for the type of browser issuing the header. In one example, a "user agent" header may include 5-15 bits of identifying information, which may be used to help identify a user, such that by browser profile monitor 140 replacing the browser issued "user agent" header with a neutral "user agent" header, browser profile monitor 140 ensures that the "user agent" header portion of a web request cannot be used by one or more other parties to help identify a user.

Figure 2:
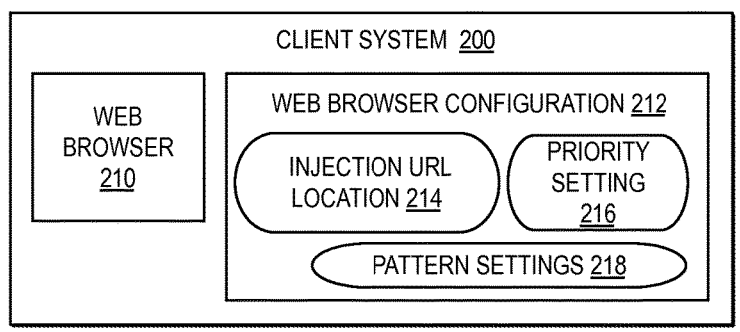
FIG. 2 illustrates one example of a block diagram of a client system for a user configured to send outbound random valid URL requests to an injection URL engine to obscure user web usage patterns.

FIG. 2 illustrates one example of a block diagram of a client system for a user configured to send outbound random valid URL requests to an injection URL engine to obscure user web usage patterns.

In one example, client system 200 represents a system in use by a user, such as user 122, user 124, user 126, or user 128, for browsing through a web browser 210. In one example, client system 200 may include one or more components through which a user may generate outbound URL requests. In one example, client system 200 includes a web browser 210, through which a user may select URLs to browse, where web browser 210 generates an outbound URL request for the user selected URL. In one example, client system 200 may include additional or alternate web browsers and other components that generate outbound URL requests.

In one example, client system 200 may include a web browser configuration 212 component configured as a stand-alone component or integrated into web browser 210, an operating system layer, a network layer, or other operating layer of client system 200. In one example, web browser configuration 212 may include an injection URL location 214 specifying a location of injection URL engine 112, through which web browser 210 is directed to send outbound URL requests.

In one example, within web browser configuration 212, when a user specifies injection URL location 214, a user may also specify a priority setting 216, where priority setting 216 specifies whether a user requests classification as a priority user and may include the user's preferences for priority user specification within local configurations 118. In one example, a user's priority preferences in priority setting 216 may include the user specifying a request for a selectable interface with an option to select particular random valid URLs to inject when a pattern is detected. In another example, a user's priority preferences in priority setting 216 may include the user specifying automatic selections of random valid URLs to insert or rules for selecting the random valid URLs to insert. In one example, a user may set a preference in priority settings 216 to automatically select a particular other user's web browsing activity as random valid URLs. In another example, a user's priority preferences in priority setting 216 may include the user specifying rules to intersperse some or all of certain types of browsing behavior with other patterns of random valid URLs.

In addition, within web browser configuration 212, when a user specifies injection URL location 214, a user may also select pattern settings 218, where pattern settings 218 specify one or more patterns that the user considers high risk and requests automatically receive random valid URL injections. In addition, in pattern settings 218 a user may specify one or more patterns that the user considers low risk and requests that no random valid URL are injected if the pattern is detected. In additional or alternate embodiments, web browser configuration 212 may include additional or alternate user settings within web browser configuration 212 for directing specification of injection URL engine 112 for a particular user.

Figure 3:
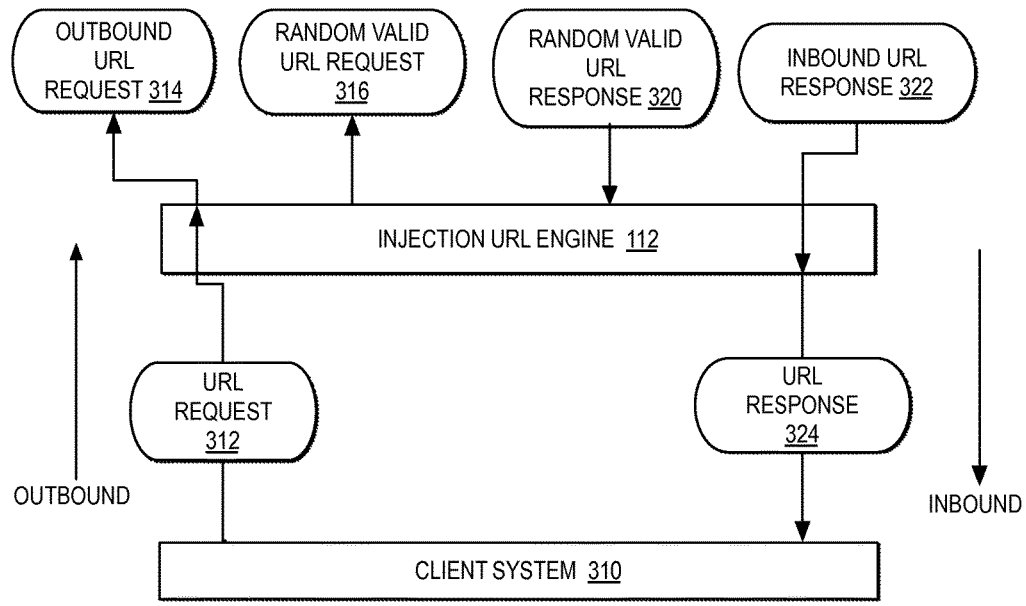
FIG. 3 illustrates one example of a block diagram of a flow of outbound URL requests and inbound URL responses through an injection URL engine.

FIG. 3 illustrates one example of a block diagram of a flow of outbound URL requests and inbound URL responses through an injection URL engine.

In one example, a client system 310 generates a URL request 312 for a user, based on a user initiated request to browse the URL, and sends URL request 312, outbound, to injection URL engine 112. Injection URL engine 112 passes URL request 312 through to the outbound web traffic for the user as outbound URL request 314 and also injects random valid URL request 316, to the outbound web traffic for the user. In one example, injected URL request 316 is sent to through a network to access a server at the URL address in random valid URL request 316 in the same manner that outbound URL request 314 is sent through a network to access a server at the URL address in outbound URL request 314. One or more other parties tracking web browsing history for the user will detect outbound URL request 314 and random valid URL request 316 as the web browsing history requested by the user, without detecting that random valid URL request 316 is injected by injection URL engine 112 and not part of the web page usage directly requested by the user.

In one example, injection URL engine 112 detects URL responses. In one example, injection URL engine 112 may classify incoming URL responses according to whether the URL response is in response to outbound URL request 314 or in response to random valid URL request 316. In one example, injection URL engine 112 may detect that inbound URL response 322 is the inbound response to outbound URL request 314 and pass the response to client system 310 as URL response 324. In another example, injection URL engine 112 may detect that random valid URL response 320 is the response to random valid URL request 316 and drop random valid URL response 320. While injection URL engine 112 may drop random valid URL responses, to reduce the response traffic to client system 310, in another example, a user may set a preference for injection URL engine 112 to pass random valid URL response 320 to client system 310, marked as a random valid URL response, and client system 310 may selectively handle the random valid URL response.

Figure 4:
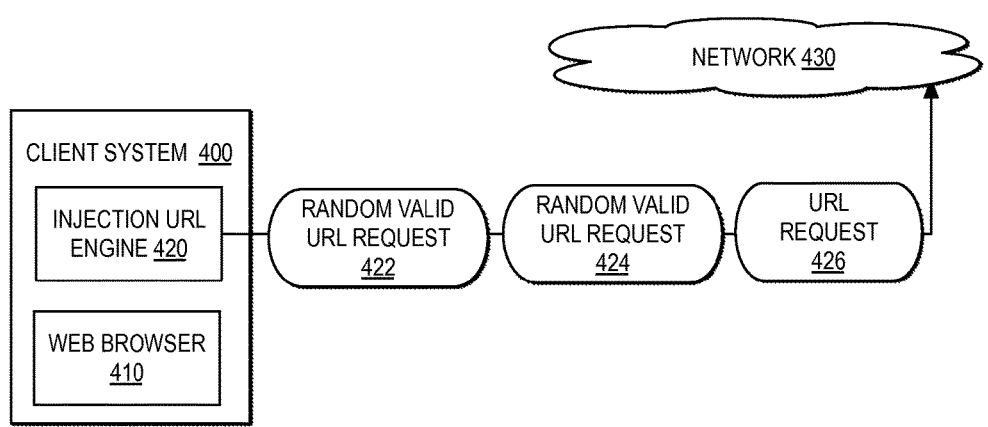
FIG. 4 illustrates one example of a block diagram of an injection URL engine component operational on a client system, wherein the client system transmits an outbound URL request including user selected URL requests and random valid URL requests that are injected by the injection URL engine to obscure the user web usage pattern.

FIG. 4 illustrates a block diagram of one example of an injection URL engine component operational on a client system, wherein the client system transmits an outbound URL request including user selected URL requests and random valid URL requests that are injected by the injection URL engine to obscure the user web usage pattern.

In one example, a client system 400 is configured with a web browser 410 for generating URL requests for a user. In addition, client system 400 is configured with an injection URL engine 420, similar to injection URL engine 112, but specified for inserting random valid URL requests into the outbound web traffic from client system 400 to a network 430. In one example, network 430 may include a first network layer accessible to client system 400 or may represent a combination of network elements and layers accessible to client system 400.

In one example, web browser 410 may pass one or more URL requests through injection URL engine 420 and injection URL engine 420 may transmit one or more outbound URL requests to network 430. For example, injection URL engine 420 may transmit a URL request 426, directly requested by a user, to network 430. In addition, injection URL engine 420 may monitor the outbound URL requests for a user and, in response to detecting that the user's requests indicate a usage pattern that would allow the user's unique identity to be ascertained, injection URL engine 420 may inject random valid URL requests into outbound web traffic for the user to network 430. In one example, injection URL engine 420 injects and transmits random valid URL request 422 and random valid URL request 424 for the user to network 430 to obscure any pattern in the user's web browsing history. In addition, injection URL engine 420 may monitor for URL responses and filter out URL responses that are in response to random valid URL requests.

While injection URL engine 420, when implemented as a component of client system 400 for managing URL requests for a single user, in contrast to injection URL engine 112, which is implemented in proxy server 110 for managing URL requests for one or more users, may or may not have access to the web usage patterns of other users for use as injection URLs and for pattern analysis, implementing injection URL engine 420 within client system 400 allows a user increased control over the settings of injection URL engine 420 and provides a URL request output stream that obscures a user's web usage pattern prior the URL requests reaching any network elements.

In one example, by implementing injection URL engine 420 on client system 400, client system 400 may mitigate against web browsing history based user identification by one or more other parties, at the client system level, when client system 400 is connected to an untrusted network. In one example, injection URL engine 420 on client system 400 may automatically detect a type or security functionality of a network that client system 400 is connected to and automatically operate if the type or security functionality of the network is one that is set to automatically trigger operation. In one example, a user may be required by an entity providing client system 400 to allow injection URL engine 420 to operate on client system 400. In one example, if an entity detects that a particular user is the target of identity tracking by one or more other parties and the user logs in at client system 400, the entity may require activation of injection URL engine 420 prior to allowing the user to authenticate and use client system 400.

Figure 5:
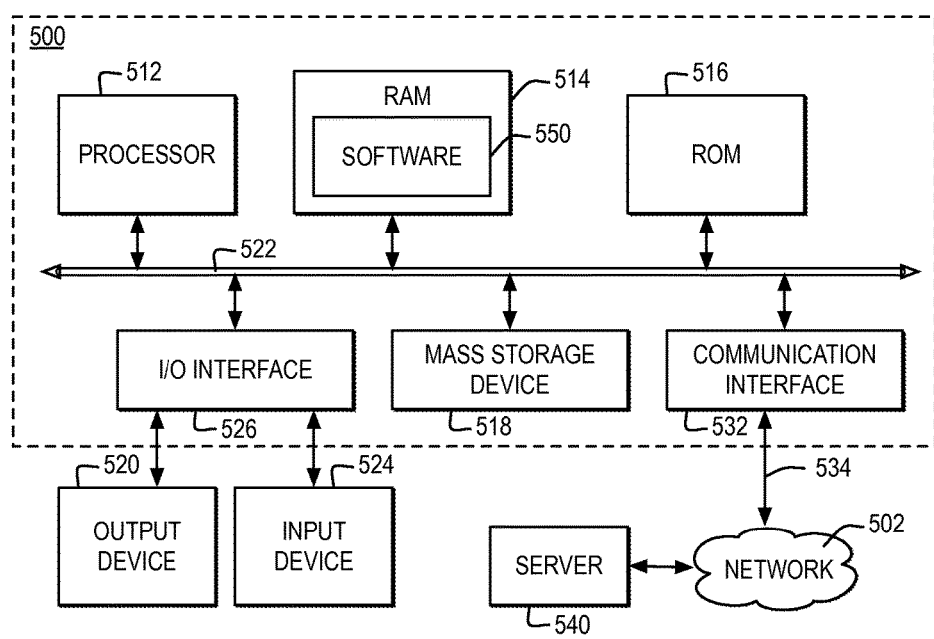
FIG. 5 illustrates one example of a block diagram of a computer system in which one embodiment of the invention may be implemented.

FIG. 5 illustrates a block diagram of one example of a computer system in which one embodiment of the invention may be implemented. The present invention may be performed in a variety of systems and combinations of systems, made up of functional components, such as the functional components described with reference to a computer system 500 and may be communicatively connected to a network, such as network 502.

Computer system 500 includes a bus 522 or other communication device for communicating information within computer system 500, and at least one hardware processing device, such as processor 512, coupled to bus 522 for processing information. Bus 522 preferably includes low-latency and higher latency paths that are connected by bridges and adapters and controlled within computer system 500 by multiple bus controllers. When implemented as a server or node, computer system 500 may include multiple processors designed to improve network servicing power.

Processor 512 may be at least one general-purpose processor that, during normal operation, processes data under the control of software 550, which may include at least one of application software, an operating system, middleware, and other code and computer executable programs accessible from a dynamic storage device such as random access memory (RAM) 514, a static storage device such as Read Only Memory (ROM) 516, a data storage device, such as mass storage device 518, or other data storage medium. Software 550 may include, but is not limited to, code, applications, protocols, interfaces, and processes for controlling one or more systems within a network including, but not limited to, an adapter, a switch, a server, a cluster system, and a grid environment.

Computer system 500 may communicate with a remote computer, such as server 540, or a remote client. In one example, server 540 may be connected to computer system 500 through any type of network, such as network 502, through a communication interface, such as network interface 532, or over a network link that may be connected, for example, to network 502.

In the example, multiple systems within a network environment may be communicatively connected via network 502, which is the medium used to provide communications links between various devices and computer systems communicatively connected. Network 502 may include permanent connections such as wire or fiber optics cables and temporary connections made through telephone connections and wireless transmission connections, for example, and may include routers, switches, gateways and other hardware to enable a communication channel between the systems connected via network 502. Network 502 may represent one or more of packet-switching based networks, telephony based networks, broadcast television networks, local area and wire area networks, public networks, and restricted networks.

Network 502 and the systems communicatively connected to computer 500 via network 502 may implement one or more layers of one or more types of network protocol stacks which may include one or more of a physical layer, a link layer, a network layer, a transport layer, a presentation layer, and an application layer. For example, network 502 may implement one or more of the Transmission Control Protocol/Internet Protocol (TCP/IP) protocol stack or an Open Systems Interconnection (OSI) protocol stack. In addition, for example, network 502 may represent the worldwide collection of networks and gateways that use the TCP/IP suite of protocols to communicate with one another. Network 502 may implement a secure HTTP protocol layer or other security protocol for securing communications between systems.

In the example, network interface 532 includes an adapter 534 for connecting computer system 500 to network 502 through a link and for communicatively connecting computer system 500 to server 540 or other computing systems via network 502. Although not depicted, network interface 532 may include additional software, such as device drivers, additional hardware and other controllers that enable communication. When implemented as a server, computer system 500 may include multiple communication interfaces accessible via multiple peripheral component interconnect (PCI) bus bridges connected to an input/output controller, for example. In this manner, computer system 500 allows connections to multiple clients via multiple separate ports and each port may also support multiple connections to multiple clients.

In one embodiment, the operations performed by processor 512 may control the operations of flowchart of FIGS. 6-9 and other operations described herein. Operations performed by processor 512 may be requested by software 550 or other code or the steps of one embodiment of the invention might be performed by specific hardware components that contain hardwired logic for performing the steps, or by any combination of programmed computer components and custom hardware components. In one embodiment, one or more components of computer system 500, or other components, which may be integrated into one or more components of computer system 500, may contain hardwired logic for performing the operations of flowcharts in FIGS. 6-9.

In addition, computer system 500 may include multiple peripheral components that facilitate input and output. These peripheral components are connected to multiple controllers, adapters, and expansion slots, such as input/output (I/O) interface 526, coupled to one of the multiple levels of bus 522. For example, input device 524 may include, for example, a microphone, a video capture device, an image scanning system, a keyboard, a mouse, or other input peripheral device, communicatively enabled on bus 522 via I/O interface 526 controlling inputs. In addition, for example, output device 520 communicatively enabled on bus 522 via I/O interface 526 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 5, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 5 may vary. Furthermore, those of ordinary skill in the art will appreciate that the depicted example is not meant to imply architectural limitations with respect to the present invention.

Figure 6:
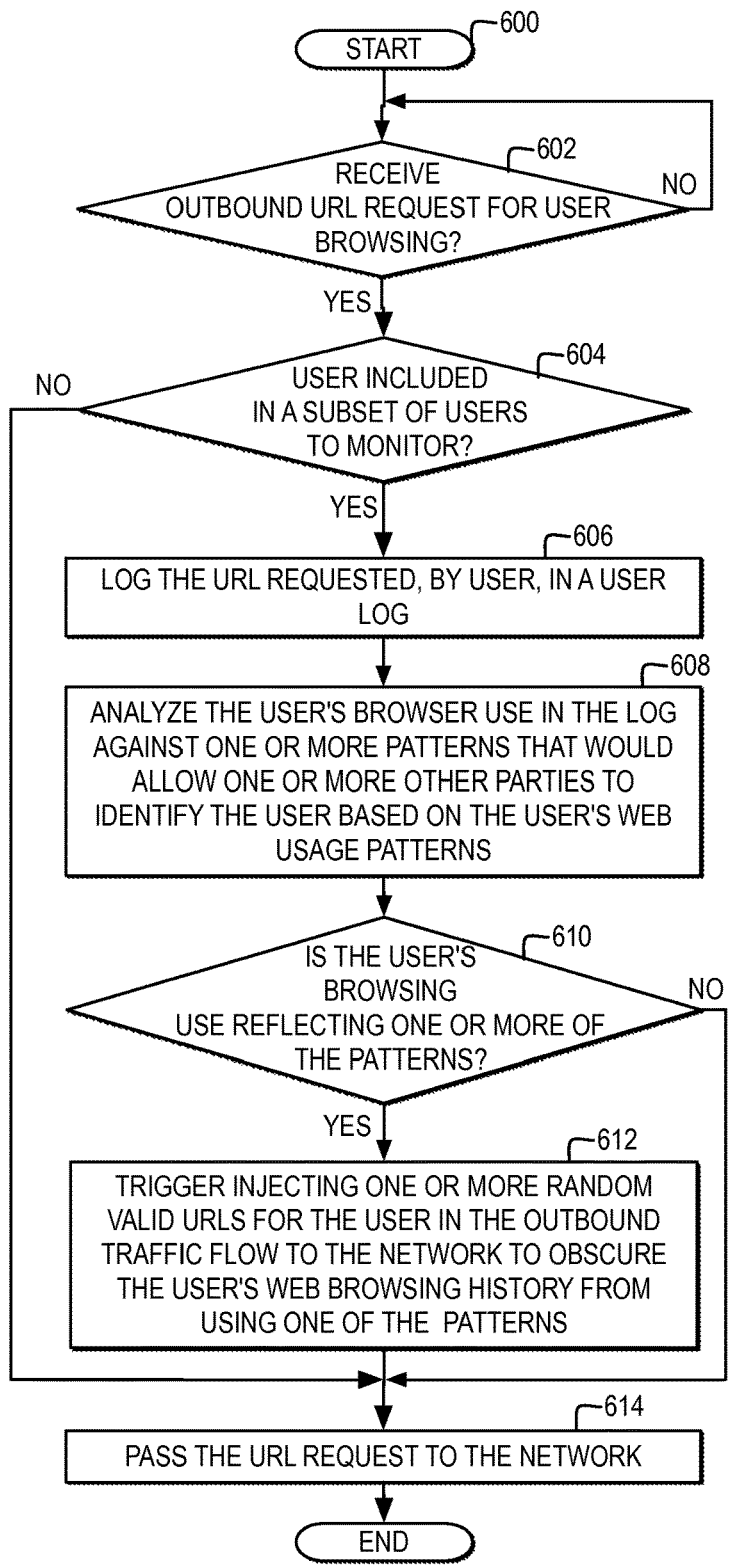
FIG. 6 illustrates a high level logic flowchart of a process and computer program product for dynamically inserting random valid URLs into outgoing web traffic for a user to obscure the user's web usage pattern.

FIG. 6 illustrates a high level logic flowchart of a process and computer program for dynamically inserting random valid URLs into outgoing web traffic for a user to obscure the user's web usage pattern.

In one example, the process and computer program starts at block 600 and thereafter proceeds to block 602. Block 602 illustrates a determination whether an outbound URL request is received for user browsing. Next, block 604 illustrates a determination whether the user identified for the outbound URL request is included in a subset of users to monitor. At block 604, if the user is not in the subset of users, then the process passes to block 614. Block 614 illustrates passing the URL request in the web traffic to the network, and the process ends. Returning to block 604, if the user is in the subset of users, then the process passes to block 606.

Block 606 illustrates logging the URL requested, by user, in a user log. Next, block 608 illustrates analyzing the user's browser use in the user's log against one or more patterns that would allow one or more other parties to identify the user based on the user's web usage patterns. In one example, analyzing the user's browser use against one or more patterns may include comparing the logs of multiple users and detecting patterns of use by the current user that make the current user uniquely identifiable from the other users according to the logs. In another example, analyzing the user's browser use against one or more patterns may include comparing the user's current web accesses, in a current browser session, against the user's previous web accesses, in a previous browser session to determine if a similar pattern of use is starting between the two browsing sessions. In another example, analyzing the user's browser use against one or more patterns may include comparing the user's browser use against preselected patterns that allow for a user's identity to more quickly ascertained from the user's browsing history. Thereafter, block 610 illustrates a determination whether the user's browser use is reflecting one or more of the patterns. At block 610, if the user's browser use is not starting to reflect one or more of the patterns, then the process passes to block 614. At block 610, if the user's browsing use is starting to reflect one or more of the patterns, then the process passes to block 612. Block 612 illustrates triggering injecting random valid URLs for the user in the outbound traffic flow to the network to obscure the user's web browsing history from using one of the patterns, and the process passes to block 614.

Figure 7A:
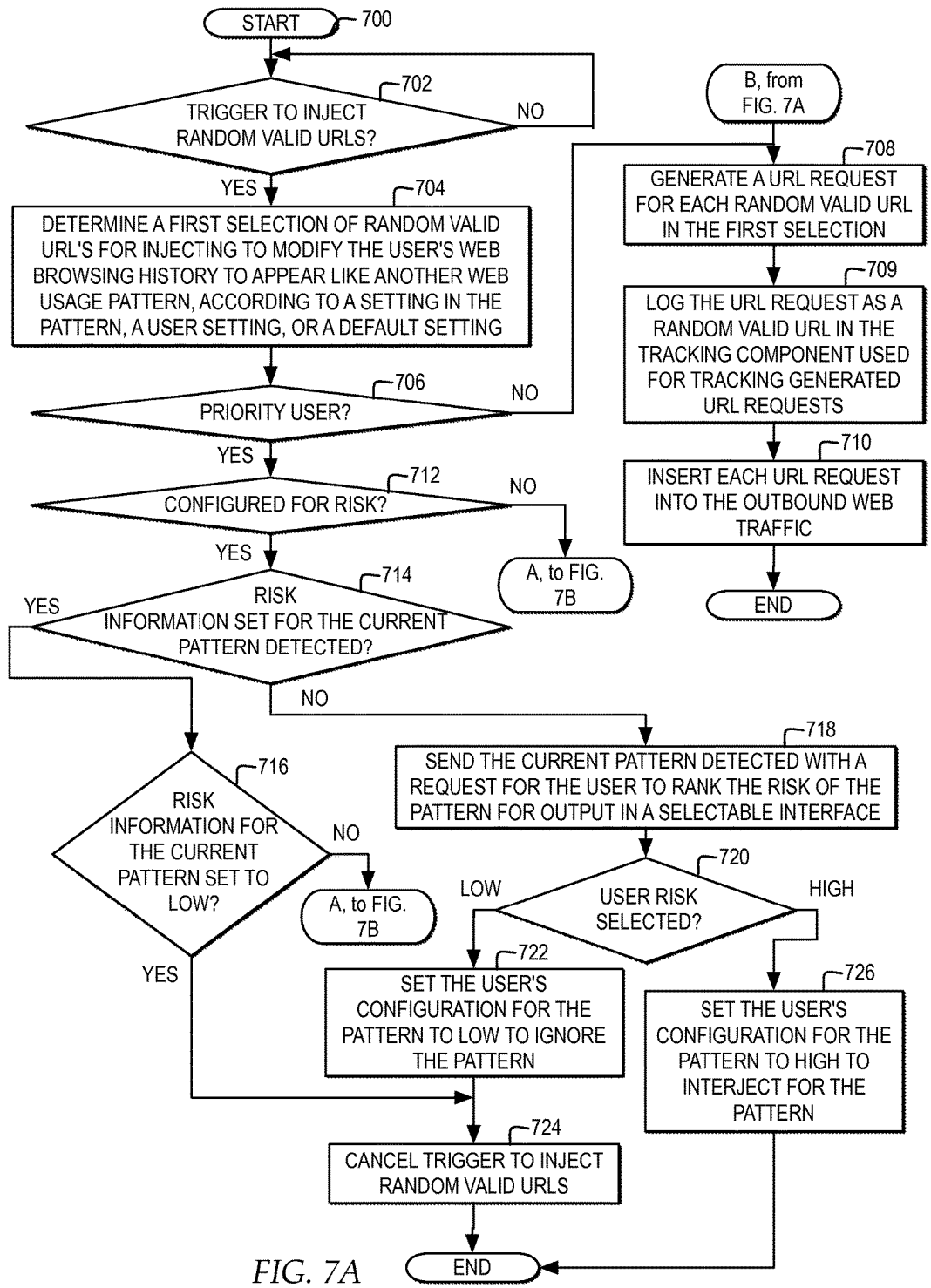
FIGS. 7A-7B illustrates a high level logic flowchart of a process and computer program product selecting the random valid URLs to inject into outbound web traffic in response to a trigger to inject random valid URLs.
Figure 7B:
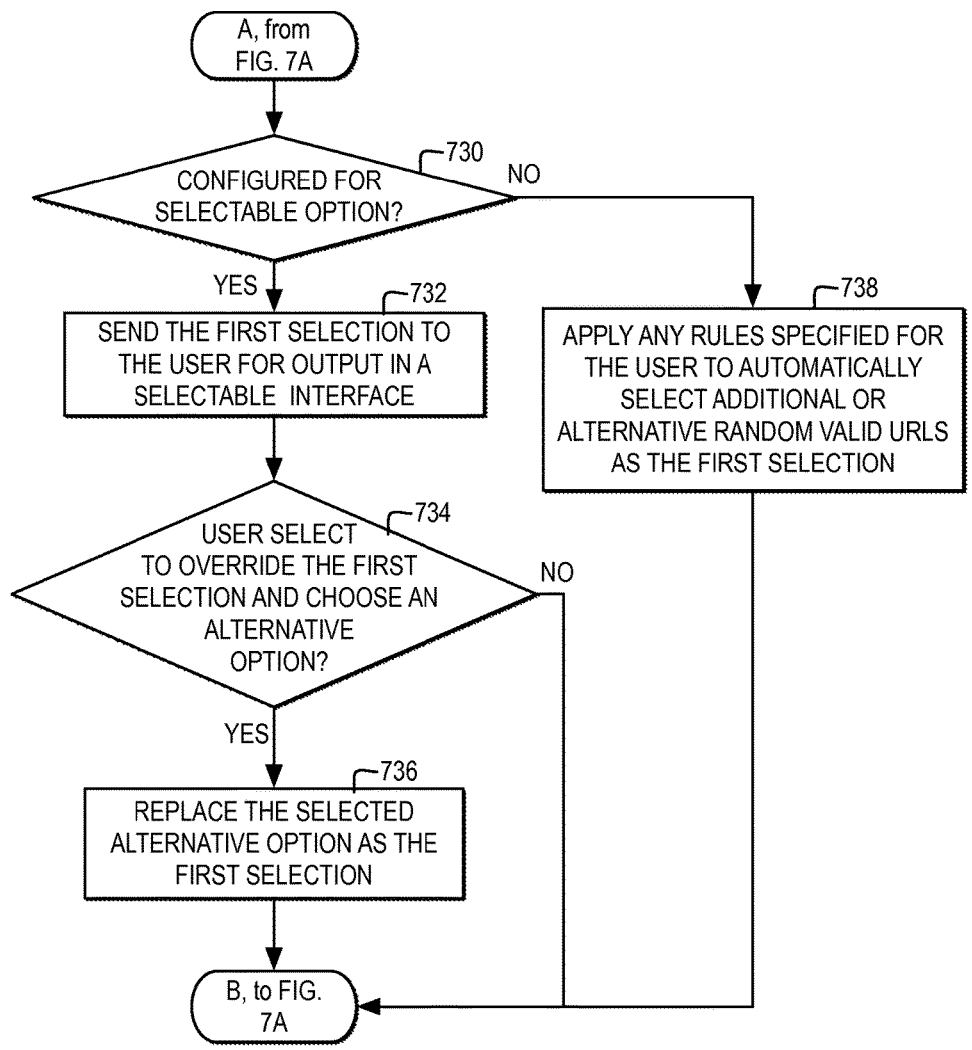

FIGS. 7A-7B illustrate a high level logic flowchart of a process and computer program for selecting the random valid URLs to inject into outbound web traffic in response to a trigger to inject random valid URLs.

In one example, the process and computer program starts at block 700 and thereafter proceeds to block 702. Block 702 illustrates a determination whether a trigger to inject random valid URLs is detected, such as the trigger illustrated in block 612 of FIG. 6. At block 702, if a trigger to inject random valid URLs is detected, then the process passes to block 704. Block 704 illustrates determining a first selection of random valid URLs for injecting to modify the user's web browsing history to appear like another web usage pattern, according to a setting in the pattern, a user configuration setting, or a default setting. Next, block 706 illustrates a determination whether the user is configured as a priority user in the local configurations. At block 706, if the user is not configured as a priority user, then the process passes to block 708. Block 708 illustrates generating a URL request for each random valid URL in the first selection. Next, block 709 illustrates logging the URL request as a random valid URL in the tracking component used for tracking generated URL requests. Next block 710 illustrates inserting each URL request into the outbound web traffic, and the process ends.

Returning to block 706, if the user is configured as a priority user, then the process passes to block 708. Block 712 illustrates a determination whether the user is configured for risk in the local configurations. At block 712, if the user is not configured for risk, then the process passes to block 730. Block 730 illustrates a determination whether the user priority setting is configured for a selectable option. At block 730, if the user priority setting is not configured for a selectable option, then the process passes to block 738. Block 738 illustrates applying any rules specified for the user to automatically select additional or alternative random valid URLs as the first selection, and the process passes to block 708. Returning to block 730, at block 730, if the user priority setting is configured for a selectable option, then the process passes to block 732. Block 732 illustrates sending the first selection to the user for output in a selectable interface. Next, block 734 illustrates a determination whether the user selects to override the first selection and choose an alternative option. At block 734, if the user does not select to override the first selection, the process passes to block 708. At block 734, if the user selects to override the first selection and choose an alternative option, then the process passes to block 736. Block 736 illustrates replacing the selected alternative option as the first selection, and the process passes to block 708.

Returning to block 712, at block 712, if the user is configured for risk, then the process passes to block 714. Block 714 illustrates a determination whether there is risk information set for the user for the current detected pattern. At block 714, if there is risk information set for the user for the current detected pattern, then the process passes to block 716. Block 716 illustrates a determination whether the risk information for the current pattern is set to "low". At block 716, if the risk information is set to "low", then the process passes to block 724. Block 724 illustrates canceling the trigger to inject random valid URLs and the process ends. Returning to block 716, if the risk information not set to "low", then the process passes to block 730.

Returning to block 714, if there is not risk information set for the user for the current detected pattern, then the process passes to block 718. Block 718 illustrates sending the current pattern detected with a request for the user to rank the risk for the pattern for output in a selectable interface. Next, block 720 illustrates a determination of the user's risk selection. At block 720, if the user's risk selection is "high", then the process passes to block 726. Block 726 illustrates setting the user's risk information setting for the pattern to "high", to interject for the pattern, and the process passes to block 730. Returning to block 720, if the user's risk selection is "low", then the process passes to block 722. Block 722 illustrates setting the user's configuration for the pattern to "low", to ignore the pattern, and the process passes to block 724. As previously noted, block 724 illustrates cancelling the trigger to inject random valid URLs, and the process ends.

FIG. 8 illustrates a high level logic flowchart of a process and computer program for managing URL responses, including URL responses to URL requests for random valid URLs.

In one example, a process and computer program starts at block 800 and thereafter proceeds to block 802. Block 802 illustrates a determination whether a URL response is received. At block 802, if a URL response is received, then the process passes to block 804. Block 804 illustrates matching the URL response to a URL request in a tracking component. Next, block 806 illustrates a determination whether the URL response matches a URL request for a random valid URL in the tracking component. At block 806, if the URL response matches a URL request for a random valid URL in the tracking component, then the process passes to block 808. Block 808 illustrates discarding the URL response, and the process ends. At block 806, if the URL response does not match a URL request for a random valid URL in the tracking component, then the process passes to block 810. Block 810 illustrates passing the URL response to the requesting user, and the process ends.

FIG. 9 illustrates a high level logic flowchart of a process and computer program for monitoring the number of user's web browsing histories being logged to determine whether to recommend creation of a dummy user with a web browsing history matching that of the current users.

In one example, the process and computer program starts at block 900 and thereafter proceeds to block 902. Block 902 illustrates a determination whether the number of user logs with web browsing histories currently being logged during a session is two or fewer. At block 902, if two or fewer user logs with web browsing histories are currently being logged, then the process passes to block 904. Block 904 illustrates outputting a notification to each logged user during the current session indicating that a dummy user with a web browsing history matching that of the user's should be constructed, and the process ends. In addition, a user may be provided an option to select to automatically create the dummy user with a web browsing history matching that of the user's.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method, comprising:
   determining, via a computer system, whether a user is a priority user; and
   obscuring, via the computer system, one or more web usage patterns of the user to disrupt the user's identification by one or more other parties when the user is browsing the web, based on whether the user is the priority user, the obscuring further comprising:
   monitoring, via the computer system, whether a pattern of a current selection of web address requests by the user in outbound web traffic for the user matches the one or more web usage patterns that allow for identifying the user based on the current selection of web address requests;
   responsive to detecting the pattern of the current selection of web address requests by the user in the outbound web traffic for the user matches the one or more web usage patterns, injecting, via the computer system, one or more random valid web address requests into the outbound web traffic for the user, wherein the one or more random valid web address requests obscure the current selection of web address requests by the user from using the one or more web usage patterns; and responsive to determining that the user is the priority user, adjusting an amount and type of the one or more random valid web address requests.

2. The method according to claim 1, further comprising:

responsive to receiving a web address request from a particular user from among a plurality of users, logging the web address request in a particular user log specified for the particular user from among a plurality of user logs each specified for a separate user from among the plurality of users; and monitoring, for each of the plurality of user logs, whether each pattern of the logged web address requests in each of the plurality of user logs matches the one or more web usage patterns.

3. The method according to claim 2, the monitoring whether a pattern of a current selection of web address requests in outbound web traffic for a user matches one or more web usage patterns that allow for identifying the user based on the current selection of web address requests further comprising:

comparing the one or more entries in each of the plurality of user logs against one other to determine one or more unique entries for the particular user in the particular user log that are only in the particular user log; and detecting that the one or more unique entries match the one or more web usage patterns that allow for identifying the particular user.

4. The method according to claim 2, further comprising:

receiving the web address request at a proxy server for managing distribution of outbound web traffic for the plurality of users to one or more network layers.

5. The method according to claim 1, the monitoring whether a pattern of a current selection of web address requests in outbound web traffic for a user matches one or more web usage patterns that allow for identifying the user based on the current selection of web address requests further comprising:

monitoring whether a particular web address request from among the current selection of web address requests matches a particular website specified in the one or more web usage patterns; and responsive to detecting the particular web address request from among the current selection of web address requests matches the particular website specified in the one or more web usage patterns, injecting the one or more random valid web address requests into the outbound web traffic for the user.

6. The method according to claim 1, responsive to detecting the pattern of the current selection of web address requests by the user matches the one or more web usage patterns, the injecting one or more random valid web address requests into the outbound web traffic for the user further comprising:

responsive to detecting the pattern of the current selection of web address requests by the user matches the one or more web usage patterns, for selecting the one or more random valid web address request from a separate selection of web address requests by a different user than the user.

7. The method according to claim 1, responsive to detecting the pattern of the current selection of web address requests by the user matches the one or more web usage patterns, the injecting one or more random valid web address requests into the outbound web traffic for the user further comprising:

responsive to determining the user is not the priority user, generating a URL request for each of the one or more random valid web address requests, logging each URL request for tracking outbound web traffic, and inserting each URL request in the outbound web traffic;

responsive to determining the user is the priority user, determining whether a user configuration for the user is specified for a selectable option;

responsive to determining the user configuration for the user is specified for the selectable option, sending a first selection of one or more random valid web addresses for output in a selectable interface; and responsive to receiving a selection by the user from the selectable interface to override the first selection, selecting an alternative selection of one or more random valid web addresses for output as the one or more random valid web address requests.

8. The method according to claim 1, further comprising:

responsive to determining the user configuration for the user is configured for risk, determining whether the user configuration specifies a risk selection for the pattern;

responsive to determining the user configuration specifies the risk selection for the pattern, determining whether the risk selection is set to low risk;

responsive to determining the risk selection is set to low risk, canceling injection of the one or more random valid web address requests into the outbound web traffic;

responsive to determining the user configuration does not specify the risk selection for the pattern, sending the pattern with a request for the user to rank the risk;

responsive to receiving a response from the user with the risk selection set to low, setting the risk selection to low in the user configuration and canceling injection of the one or more random valid web address requests into the outbound web traffic; and responsive to receiving a response from the user with the risk selection set to high, setting the risk selection to high in the user configuration.

9. The method according to claim 1, further comprising:

responsive to receiving a web address response from one or more network layers, determining whether the web address response is in response to the one or more random valid web address requests;

responsive to detecting the web address response is in response to the one or more random valid web address requests, dropping the web address response; and responsive to detecting the web address response is not in response to the one or more random valid web address requests, passing the web address response to the user.

10. A computer system comprising one or more processors, one or more computer readable memories, one or more computer-readable storage devices, and program instructions, stored on at least one of the one or more storage devices for execution by at least one of the one or more processors via at least one of the one or more memories, the stored program instructions comprising:

program instructions to determine whether a user is a priority user; and program instructions to obscure one or more web usage patterns of the user to disrupt the user's identification by one or more other parties when the user is browsing the web, based on whether the user is the priority user, the program instructions to obscure further comprising:

program instructions to monitor whether a pattern of a current selection of web address requests by the user in outbound web traffic for the user matches the one or more web usage patterns that allow for identifying the user based on the current selection of web address requests;

program instructions, responsive to detecting the pattern of the current selection of web address requests by the user in the outbound web traffic for the user matches the one or more web usage patterns, to inject one or more random valid web address requests into the outbound web traffic for the user, wherein the one or more random valid web address requests obscure the current selection of web address requests by the user from using the one or more web usage patterns; and program instructions, responsive to determining that the user is the priority user, to adjust an amount and type of the one or more random valid web address requests.

11. The computer system according to claim 10, the stored program instructions further comprising:

program instructions, responsive to receiving a web address request from a particular user from among a plurality of users, to log the web address request in a particular user log specified for the particular user from among a plurality of user logs each specified for a separate user from among the plurality of users; and program instructions to monitor, for each of the plurality of user logs, whether each pattern of the logged web address requests in each of the plurality of user logs matches the one or more web usage patterns.

12. The computer system according to claim 11, the stored program instructions further comprising:

program instructions to compare the one or more entries in each of the plurality of user logs against one other to determine one or more unique entries for the particular user in the particular user log that are only in the particular user log; and program instructions to detect that the one or more unique entries match the one or more web usage patterns that allow for identifying the particular user.

13. The computer system according to claim 11, the stored program instructions further comprising:

program instructions to receive the web address request at a proxy server for managing distribution of outbound web traffic for the plurality of users to one or more network layers.

14. The computer system according to claim 10, the stored program instructions further comprising:

program instructions to monitor whether a particular web address request from among the current selection of web address requests matches a particular website specified in the one or more web usage patterns; and program instructions, responsive to detecting the particular web address request from among the current selection of web address requests matches the particular website specified in the one or more web usage patterns, to inject the one or more random valid web address requests into the outbound web traffic for the user.

15. The computer system according to claim 10, the stored program instructions further comprising:

program instructions, responsive to detecting the pattern of the current selection of web address requests by the user matches the one or more web usage patterns, to select the one or more random valid web address request from a separate selection of web address requests by a different user than the user.

16. The computer system according to claim 10, the stored program instructions further comprising:

program instructions, responsive to determining the user is not the priority user, to generate a URL request for each of the one or more random valid web address requests, logging each URL request for tracking outbound web traffic, and inserting each URL request in the outbound web traffic;

program instructions, responsive to determining the user is the priority user, to determine whether a user configuration for the user is specified for a selectable option;

program instructions, responsive to determining the user configuration for the user is specified for the selectable option, to send a first selection of one or more random valid web addresses for output in a selectable interface; and program instructions, responsive to receiving a selection by the user from the selectable interface to override the first selection, to select an alternative selection of one or more random valid web addresses for output as the one or more random valid web address requests.

17. The computer system according to claim 10, the stored program instructions further comprising:

program instructions, responsive to determining the user configuration for the user is configured for risk, to determine whether the user configuration specifies a risk selection for the pattern;

program instructions, responsive to determining the user configuration specifies the risk selection for the pattern, to determine whether the risk selection is set to low risk;

program instructions, responsive to determining the risk selection is set to low risk, to cancel injection of the one or more random valid web address requests into the outbound web traffic;

program instructions, responsive to determining the user configuration does not specify the risk selection for the pattern, to send the pattern with a request for the user to rank the risk;

program instructions, responsive to receiving a response from the user with the risk selection set to low, to set the risk selection to low in the user configuration and canceling injection of the one or more random valid web address requests into the outbound web traffic; and program instructions, responsive to receiving a response from the user with the risk selection set to high, to set the risk selection to high in the user configuration.

18. The computer system according to claim 10, the stored program instructions further comprising:

program instructions, responsive to receiving a web address response from one or more network layers, to determine whether the web address response is in response to the one or more random valid web address requests;

program instructions, responsive to detecting the web address response is in response to the one or more random valid web address requests, to drop the web address response; and program instructions, responsive to detecting the web address response is not in response to the one or more random valid web address requests, to pass the web address response to the user.

19. A computer program product comprising one or more computer-readable storage devices and program instructions, stored on at least one of the one or more storage devices, the stored program instructions comprising:
   program instructions to determine whether a user is a priority user; and
   program instructions to obscure one or more web usage patterns of the user to disrupt the user's identification by one or more other parties when the user is browsing the web, based on whether the user is the priority user, the program instructions to obscure further comprising:
   program instructions to monitor whether a pattern of a current selection of web address requests by the user in outbound web traffic for the user matches the one or more web usage patterns that allow for identifying the user based on the current selection of web address requests;
   program instructions, responsive to detecting the pattern of the current selection of web address requests by the user in the outbound web traffic for the user matches the one or more web usage patterns, to inject one or more random valid web address requests into the outbound web traffic for the user, wherein the one or more random valid web address requests obscure the current selection of web address requests by the user from using the one or more web usage patterns; and
   program instructions, responsive to determining that the user is the priority user, to adjust an amount and type of the one or more random valid web address requests.

20. The computer program product according to claim 19, the stored program instructions further comprising:
   program instructions, responsive to receiving a web address request from a particular user from among a plurality of users, to log the web address request in a particular user log specified for the particular user from among a plurality of user logs each specified for a separate user from among the plurality of users; and
   program instructions to monitor, for each of the plurality of user logs, whether each pattern of the logged web address requests in each of the plurality of user logs matches the one or more web usage patterns.

* * * * *